(12) United States Patent
Weimer et al.

(10) Patent No.: US 12,240,404 B2
(45) Date of Patent: Mar. 4, 2025

(54) VEHICLE OCCUPANT RESTRAINT SYSTEM

(71) Applicant: ZF AUTOMOTIVE GERMANY GMBH, Alfdorf (DE)

(72) Inventors: Benjamin Weimer, Spraitbach (DE); Werner Freisler, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/015,128

(22) PCT Filed: Jul. 5, 2021

(86) PCT No.: PCT/EP2021/068446
§ 371 (c)(1),
(2) Date: Jan. 9, 2023

(87) PCT Pub. No.: WO2022/008405
PCT Pub. Date: Jan. 13, 2022

(65) Prior Publication Data
US 2023/0256931 A1   Aug. 17, 2023

(30) Foreign Application Priority Data
Jul. 10, 2020   (DE) ...................... 10 2020 118 338.0

(51) Int. Cl.
*B60R 21/231* (2011.01)
*B60R 21/16* (2006.01)
(Continued)

(52) U.S. Cl.
CPC ................ *B60R 21/23138* (2013.01); *B60R 2021/0048* (2013.01); *B60R 2021/161* (2013.01); *B60R 21/207* (2013.01); *B60R 2021/23146* (2013.01)

(58) Field of Classification Search
CPC ............. B60R 21/23138; B60R 21/07; B60R 2021/0048; B60R 2021/161; B60R 2021/23146; B60R 21/239
See application file for complete search history.

(56) References Cited

U.S. PATENT DOCUMENTS

| 2006/0131847 A1* | 6/2006 | Sato | B60R 21/23138 280/730.2 |
| 2017/0057449 A1* | 3/2017 | Weiss | B60R 21/23138 |
| 2019/0299903 A1* | 10/2019 | Nagasawa | B60R 21/0132 |

FOREIGN PATENT DOCUMENTS

| CN | 110329201 A | * 10/2019 | ......... B60R 21/0132 |
| CN | 110395213 A | 11/2019 | |

(Continued)

OTHER PUBLICATIONS

PCT International Application for corresponding International Application Serial No. PCT/EP2021/068446, mailed Oct. 29, 2021, pp. 1-4.

*Primary Examiner* — Karen Beck
(74) *Attorney, Agent, or Firm* — Tarolli, Sundheim, Covell & Tummino LLP

(57) ABSTRACT

A vehicle occupant restraint system comprises a vehicle seat (12) including a backrest (14) having a seat back surface (30), and an airbag module (16) integrated in the vehicle seat (12) including an airbag (20) which is L-shaped in a horizontal section plane and includes a cushioning portion (28) positioned along a seat longitudinal direction (L) spaced apart from the seat back surface (30), as well as a connecting portion (26) connecting the cushioning portion (28) to the vehicle seat (12). A fillable head protection chamber (34) projecting from the cushioning portion (28) along a seat vertical direction (H) which includes a head cushioning surface (36) facing the seat back surface (30) is arranged on the cushioning portion (28).

11 Claims, 2 Drawing Sheets

Figure 1:
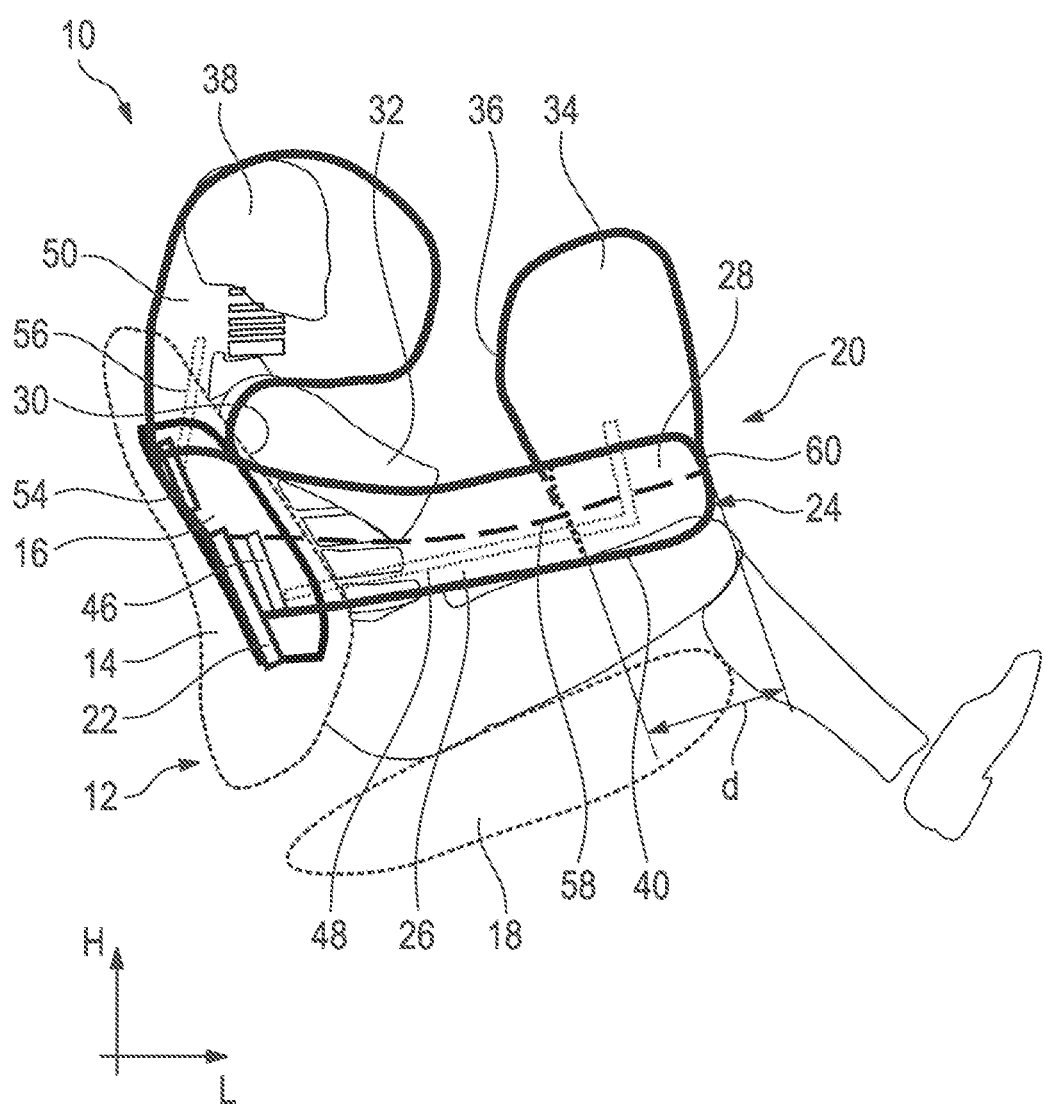

(51) Int. Cl.
*B60R 21/207* (2006.01)
*B60R 21/00* (2006.01)

(56) References Cited

FOREIGN PATENT DOCUMENTS

| | | | | |
|---|---|---|---|---|
| CN | 113071445 A | * | 7/2021 | ........... B60R 21/207 |
| DE | 19704657 A1 | | 8/1997 | |
| DE | 102018215098 A1 | | 3/2019 | |
| DE | 102018104392 A1 | * | 8/2019 | ....... B60R 21/23138 |
| DE | 102019124091 A1 | * | 7/2020 | ............. B60R 21/16 |
| DE | 102020118339 A1 | * | 1/2022 | ....... B60R 21/23138 |
| KR | 20190126213 A | | 11/2019 | |
| WO | WO-2020141737 A1 | * | 7/2020 | |
| WO | WO-2022008403 A1 | * | 1/2022 | ....... B60R 21/23138 |
| WO | WO-2022097459 A1 | * | 5/2022 | |

* cited by examiner

VEHICLE OCCUPANT RESTRAINT SYSTEM

RELATED APPLICATIONS

This application is a U.S. National Stage Application filed under 35 USC 371, claiming priority to Serial No. PCT/EP2021/068446, filed on 5 Jul. 2021; which claims priority from German Patent Application DE 10 2020 118 338.0, filed 10 Jul. 2020, the entireties of which are hereby incorporated herein by reference.

The invention relates to a vehicle occupant restraint system.

Among other things, regarding the topic of autonomous driving, considerations are made to offer the vehicle occupants greater freedom in terms of their seating position. This entails that the position of the vehicle seats relative to other vehicle components becomes more indefinite. Consequently, there will be the necessity to equip the vehicle seats with airbags that have sufficient inherent rigidity to safely cushion the occupant seated in the associated seat even without any possibility of supporting the airbags on other vehicle components.

It is the object of the invention to improve the restraining effect of an airbag in a vehicle occupant restraint system.

This object is achieved by a vehicle occupant restraint system which comprises a vehicle seat having a backrest including a seat back surface, the seat back surface being provided for a vehicle occupant seated in the vehicle seat to lean against the same. Moreover, an airbag module integrated in the vehicle seat is provided which comprises an airbag that is L-shaped in a horizontal section plane and has a cushioning portion forming a first leg of the L and being positioned along a seat longitudinal direction spaced apart from the seat back surface. In addition, the airbag comprises a connecting portion forming a second leg of the L which connects the cushioning portion to the vehicle seat. A fillable head protection chamber projecting from the cushioning portion along a seat vertical direction and including a head cushioning surface facing the seat back surface is disposed on the cushioning portion.

The head protection chamber is brought into its restraining position in which it can cushion the head of the vehicle occupant in a situation of restraint by the L-shaped arrangement of the connecting portion and the cushioning portion, and is supported in said position. In this way, the protection for a vehicle occupant in the event of forward displacement can be improved by a seat-integrated airbag.

This L-shaped arrangement formed by the fillable connecting portion and the fillable cushioning portion forms an inherently rigid, dimensionally stable basis and, therefore, in the following will be referred to as base airbag.

Said base airbag may bring one or more further fillable chambers, in this case, e.g., the fillable head protection chamber, into a desired position while it deploys and fills, and in the completely inflated state can serve as a supporting base for said chamber(s).

The head protection chamber is preferably formed to have a significantly smaller volume than the base airbag and has an oblong cross-section, e.g., in the horizontal plane in a seat vertical direction above the horizontal section plane in which the base airbag shows an L-shaped cross-section. For example, the head protection chamber in the filled state is approximately cuboid or pillow-shaped.

Along a seat longitudinal direction, the head protection chamber may have approximately the same depth as the cushioning portion and also in the seat transverse direction may have substantially the same dimensions as the cushioning portion.

In the completely filled state of the airbag, the head protection chamber is preferably opposed, along the seat longitudinal direction, to the head of the vehicle occupant and cushions the head upon forward displacement of the occupant along the seat longitudinal direction.

In addition to the head cushioning surface, another baffle for cushioning the vehicle occupant may be provided on the airbag, which baffle is preferably configured on the cushioning portion and extends in extension of the head cushioning surface below the latter toward a seat portion of the vehicle seat.

The seat longitudinal direction is defined in this case by the direction of arranging the backrest and a seat portion on which the vehicle occupant is seated, and corresponds to the viewing direction of a vehicle occupant seated in the vehicle seat. In a conventional seat orientation, the seat longitudinal direction coincides with a vehicle longitudinal direction.

The seat vertical direction corresponds to the vertical in this case.

Since the whole airbag is integrated in the vehicle seat, the airbag is always in the correct position to cushion the vehicle occupant in a situation of restraint, even if the vehicle seat is rotated relative to the vehicle longitudinal direction or, for example, the backrest is reclined into a comfort position.

For additional stabilization, the L-shaped base airbag may include, at the cushioning portion and/or at the connecting portion, at least one stabilizing element which stabilizes the position of the cushioning portion relative to the connecting portion during the situation of restraint and which ensures that, when the vehicle occupant is cushioned, the cushioning portion largely maintains its position relative to the connecting portion as compared to an unloaded position.

A tether extending inside the base airbag which is connected at one or more points to the outer wall of the airbag and, for example, also to the backrest is suitable, for example, as a stabilizing element.

In one variant, the tether may be connected to a retraction mechanism that shortens a length of the tether extending in the interior of the base airbag during the situation of restraint.

In a preferred variant, the stabilizing element is a flat L-shaped tether which extends through the cushioning portion and the connecting portion and which is disposed, e.g., in parallel to upper and/or lower sides of the base airbag and is connected to the wall of the airbag.

In another variant, also one or more stabilizing elements in the form of triangular fabric sails, for example, can be used which are attached specifically to the outside of the wall of the airbag in the area of the transition from the cushioning portion to the connecting portion.

Even a combination of plural similar or different stabilizing elements is conceivable. In preferred embodiments, the airbag includes at least one stabilizing element that is designed as a flat L-shaped tether.

In a completely filled state of the airbag, the head protection chamber may have an internal pressure different from that of the base airbag of the airbag. In this way, a desired restraining behavior of the head protection chamber can be adjusted. The gas pressure inside the head protection chamber may be selected to be higher or lower than the gas pressure inside the base airbag.

For example, overflow openings or overflow valves through which filling gas flows from the cushioning portion into the head protection chamber are provided between the cushioning portion and the head protection chamber. In this case, the base airbag and the head protection chamber are filled using the same inflator. By appropriately selecting the overflow openings or overflow valves, it is possible to adjust a lower internal pressure in the head protection chamber than in the base airbag.

Alternatively, it is also possible to connect the head protection chamber to an inflator via a separate filling gas supply line which is separate from a filling gas supply line to the remaining airbag, i.e., to the base airbag. Accordingly, the wall of the head protection chamber is tightly connected to the wall of the base airbag, but there need not necessarily be a possibility of gas transfer between the base airbag and the head protection chamber. The advantage in this case resides in the fact that the internal pressure of the head protection chamber can be selected individually, wherein the gas supply line to the head protection chamber does not have to perform any function regarding stabilization or positioning of the head protection chamber, however, as this is effectuated through the base airbag.

The filling gas for the head protection chamber can be generated by an inflator which is provided in addition to an inflator provided for filling the base airbag, or else by the inflator of the base airbag.

Preferably, all inflators are comprised in one single airbag module disposed in the backrest, however, so as to facilitate assembly of the vehicle occupant restraint system.

Said airbag module usually also contains the folded airbag.

The filling gas is supplied to the base airbag preferably via an inflation mouth of the base airbag that is provided at the connecting portion and is connected directly to the inflator in the backrest.

In a possible variant, the airbag module additionally comprises a fillable side protection chamber which, in the filled state, extends on the side of the backrest next to a head of the vehicle occupant.

The side protection chamber may be a lateral airbag separate from the base airbag. Preferably, the side protection chamber is directly connected to the base airbag, analogously to the head protection chamber, however. In the latter case, the side protection chamber is connected to a part of the connecting portion close to the backrest, for example, and by the latter is brought into position and stabilized in its position.

The side protection chamber may be attached at an upper end of the connecting portion of the base airbag in the seat vertical direction.

Preferably, the side protection chamber protrudes beyond an upper end of the backrest to completely cover the head of the vehicle occupant.

Analogously to the head protection chamber, the internal pressure of the side protection chamber can be adjusted to be equal to or different from the internal pressure of the base airbag. If the internal pressure of the side protection chamber is intended to be different from that of the base airbag, a lower internal pressure can be obtained via appropriate overflow openings or overflow valves, for example, whereas a higher internal pressure is preferably generated by a separate inflator associated with the side protection chamber.

Preferably, in order to facilitate assembly, the side protection chamber is grouped in the same module housing or the same module envelope as the base airbag and the head protection chamber, however.

For further stabilizing the airbag, on a lower side of the cushioning portion of the airbag a bearing surface can be provided for the airbag to rest against the thighs of the vehicle occupant in the vehicle seat, which also improves the positioning of the cushioning portion and the head protection chamber. The bearing surface is provided directly below the head protection chamber as seen in a top view, for example.

The stabilization of the airbag can be alternatively or additionally improved also by providing at the vehicle seat at least one support element associated with the airbag which constitutes a reaction surface against which the connecting portion, the cushioning portion, the head protection chamber and/or the side protection chamber rest when the vehicle occupant is cushioned by the airbag. The support element may be designed as a rigid component or as a component fillable with gas and can be, for example, an extendible support plate disposed on the vehicle seat or an airbag having a small volume and a high internal pressure. In the situation of restraint, the support element should form an enlarged surface area on the seat which is located on the side of the airbag and which, when the vehicle occupant is cushioned by the airbag, absorbs laterally outwardly acting loads and deflects them into the vehicle seat so as to support the airbag and maintain it in the desired position.

Figure 2:
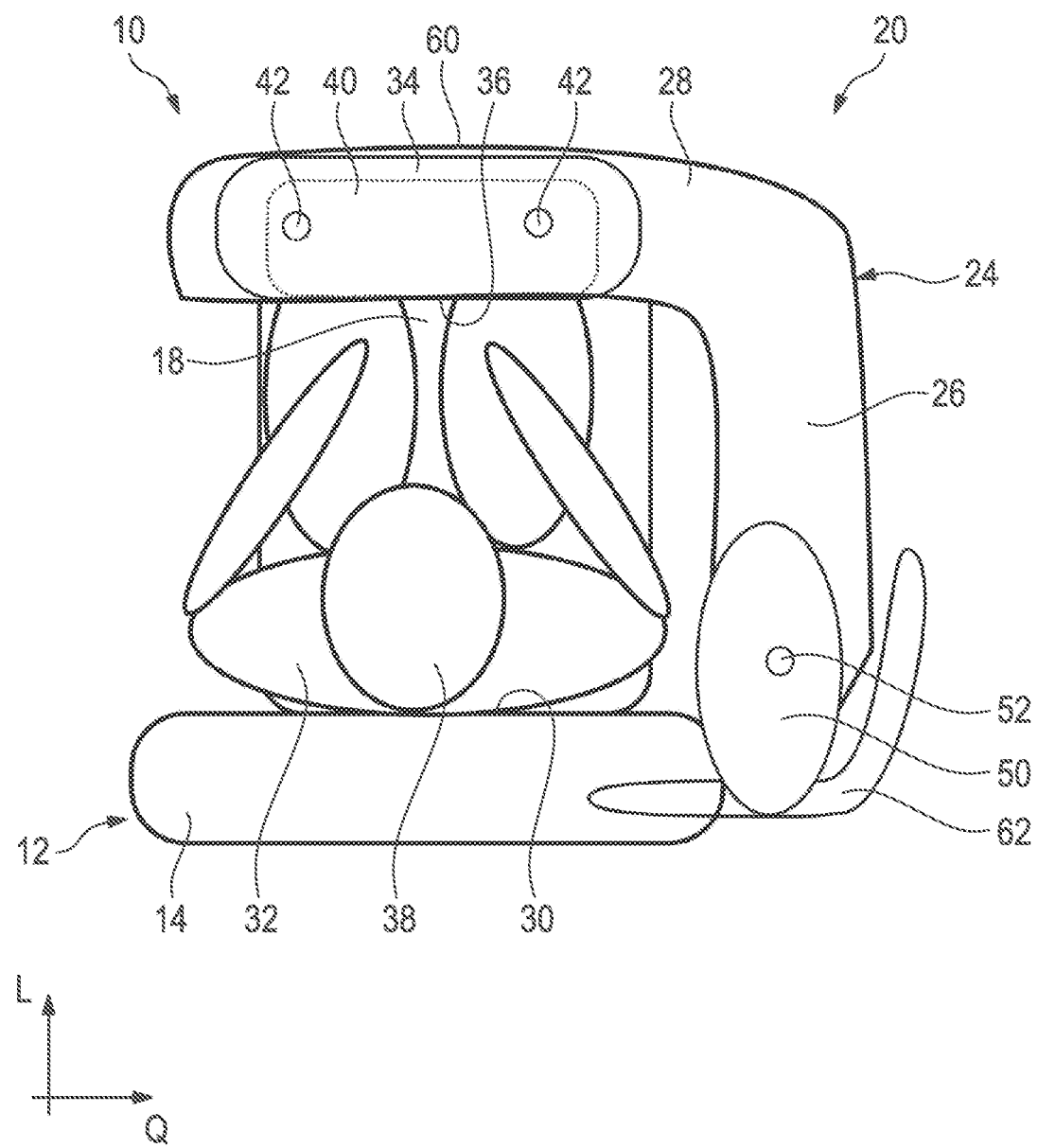

In the following, the invention shall be described in detail by means of an embodiment with reference to the attached Figures, wherein:

FIG. 1 shows a schematic lateral view of a vehicle occupant restraint system according to the invention, with the airbag being completely filled; and FIG. 2 shows the vehicle occupant restraint system of FIG. 1 in a top view.

The Figures illustrate a vehicle occupant restraint system 10 comprising a vehicle seat 12 including an airbag module 16 integrated in a backrest 14.

Apart from the backrest 14, the vehicle seat 12 also includes a conventionally known seat portion 18, the backrest 14 and the seat portion 18 being arranged one behind the other in a seat longitudinal direction L. In a conventional vehicle during a normal driving situation, the seat longitudinal direction L coincides with a vehicle longitudinal direction. However, it is also imaginable to provide driving situations in which the vehicle seat 12 is disposed in a deviating position so that the seat longitudinal direction L deviates from or is even oriented against the vehicle longitudinal direction.

Before a situation of restraint occurs, in the airbag module 16 an airbag 20 is accommodated in a folded state. If a situation of restraint occurs, the airbag 20 is filled with filling gas via an inflator 22 of the airbag module 16 and deploys out of the backrest 14 into the three-dimensional shape shown in FIGS. 1 and 2.

The airbag 20 comprises a base airbag 24 that includes a connecting portion 26 extending along the seat longitudinal direction L and a cushioning portion 28 connected to the connecting portion 26 and extending in the seat transverse direction Q perpendicularly to the seat longitudinal direction L. The base airbag 24 thus is L-shaped, the connecting portion 26 forming a first leg of the L, in this case the transverse leg, and the cushioning portion 28 forming a second leg of the L, in this case the longitudinal leg (the length ratios of the connecting portion 26 and the cushioning portion 28 can be selected at will, however).

The connecting portion 26 is tightly connected to the airbag module 16 in the backrest 14, while the cushioning portion 28 is located, without its own tight connection to the vehicle seat 12, in the vehicle interior in front of a seat back surface 30 of the backrest 14.

The seat back surface 30 is the area against which a vehicle occupant 32 leans when he/she has taken a seat in the vehicle seat 12.

At the upper end of the cushioning portion 28 in a seat vertical direction H, a fillable head protection chamber 34 projecting from the cushioning portion 28 is provided which is structurally connected to the cushioning portion 28, for example, by a jacket of the head protection chamber 34 being sewn with a jacket of the base airbag 24.

The seat vertical direction H corresponds to the vertical in this case.

As is evident from FIG. 1, in the completely filled state the head protection chamber 34 extends along the seat vertical direction H so far that a head cushioning surface 36 directed toward the seat back surface 30 at the head protection chamber 34 is in a suitable position to cushion a head 38 of the vehicle occupant 32, if, in a situation of restraint, the latter is displaced forward along the seat longitudinal direction L.

Beneath the head cushioning surface 36, in this example the cushioning portion 28 has an additional baffle which also serves for cushioning the vehicle occupant 32.

FIG. 2 illustrates that the head protection chamber 34 extends, e.g., approximately over the width of the seat portion 18 along the seat transverse direction Q or at least over the thighs of the vehicle occupant 32.

On a lower side of the cushioning portion 28 in the area of the head protection chamber 34, a support surface 40 is provided by which the airbag 20 rests on the thighs of the vehicle occupant 32 over a distance d along the seat longitudinal direction L to additionally support the airbag 20.

In a first variant, the fillable interior of the head protection chamber 34 is in fluid communication with the fillable interior of the base airbag 24. For this purpose, in FIG. 2 two overflow openings or overflow valves 42 are indicated via which filling gas generated by the inflator 22 and flowing into the base airbag 24 flows from the latter into the head protection chamber 34. When overflow valves are used, it is possible to select the internal pressure of the completely filled head protection chamber 34 to be lower than the internal pressure of the completely filled base airbag 24.

In another variant, for filling the head protection chamber 34 a dedicated separate inflator 46 is provided which is connected to a dedicated filling gas supply line 48 which supplies the filling gas directly and exclusively into the head protection chamber 34 (indicated by a broken line in FIG. 1). In this way, it would also be possible to fill the head protection chamber 34 with a higher internal pressure than the base airbag 24. In this case, no fluid communication has to be provided between the interior of the head protection chamber 34 and the interior of the base airbag 24.

In the example illustrated here, the airbag 20 also includes a fillable side protection chamber 50 that extends, in the completely filled state, on the side of the backrest 14 next to the head 38 of the vehicle occupant 32, as can be seen from the Figures.

The side protection chamber 50 protrudes beyond an upper end of the backrest 14.

In the example shown here, the side protection chamber 50 is arranged on and also structurally attached to an upper end of the connecting portion 26 of the base airbag 24 in the seat vertical direction H. This can be done, for example, by connecting, such as sewing, a jacket of the side protection chamber 50 to the jacket of the connecting portion 26.

In this area, an overflow opening or an overflow valve 52 may also be provided so that the side protection chamber 50 can be filled via the inflator 22 which fills the base airbag 24.

When making use of an overflow valve, it would be conceivable to adjust a lower internal pressure for the side protection chamber 50 than for the base airbag 24.

As an alternative, it is possible, as discussed before concerning the head protection chamber 34, to provide a dedicated separate inflator 54 for the side protection chamber 50 which supplies filling gas into the side protection chamber 50 via a separate filling gas supply line 56. In this case, no fluid communication is necessary between the side protection chamber 50 and the base airbag 24.

In this example, all inflators 22, 46, 54 are comprised in the airbag module 16. The head protection chamber 34 and the side protection chamber 50 are also accommodated in a folded state together with the base airbag 24 in the airbag module 16.

Alternatively (not shown) it is possible that the base airbag 24, the head protection chamber 34 and/or the side protection chamber 50 are filled by the same inflator 22, the gas being distributed via a suitable diffusor. Such a diffusor can help adapt the gas distribution and, thus, the internal pressure of the base airbag 24, the head protection chamber 34 and/or the side protection chamber 50 in a simple manner. Such a diffusor for gas distribution is illustrated in DE 10 2019 124 202, for example.

The base airbag 24 in this case includes at least one stabilizing element 58 which is indicated schematically by a broken line in FIG. 1.

The stabilizing element 58 may be designed in any way. For example, it is formed by one or more tethers that extend through the interior of the cushioning portion 28 and the connecting portion 26.

In a preferred variant, the tether is in the form of the L-shaped cross-section of the base airbag 24 and is connected to the wall of the base airbag 24.

In another possible variant, the tether is fixed to an outer wall 60 of the cushioning portion 28 and is connected to a retracting mechanism disposed in the backrest 14 which, in the situation of restraint, shortens the effective length of the tether so as to stabilize the cushioning portion 28 in its position. In a third variant, the stabilizing element 58 is a fabric sail that is attached at a transition between the cushioning portion 28 without a connecting portion 26 to the outside of the wall of the base airbag 24 to hold the cushioning portion 28 in position.

In the example illustrated here, the vehicle occupant restraint system 10 additionally comprises at least one support element 62 disposed on the vehicle seat 12 and forming a reaction surface against which the connecting portion 26, the cushioning portion 28, the head protection chamber 34 and/or the side protection chamber 50 are supported when the vehicle occupant 32 is cushioned by the airbag 20. The support element 62 is a rigid member, for example, that is accommodated in the interior of the vehicle seat 12 prior to the situation of restraint and is moved out of the vehicle seat 12 in the situation of restraint so that the airbag 20 is provided with a rigid reaction surface which can absorb the loads acting on the airbag 20 when the vehicle occupant is cushioned and can deflect them into the vehicle seat 12. Instead of a rigid member, the support element 62 could also be formed, for example, by a separate small airbag having a high internal pressure which is capable of exerting a supporting effect on the airbag 20 and of holding the latter in the desired position.

During a situation of restraint, the inflators 22, 46, 54 are activated, and the outflowing filling gas causes the airbag 20 to deploy from the airbag module 16 out of the backrest 14. Accordingly, the base airbag 24, viz. the connecting portion 26 and the cushioning portion 28, fills with gas. In addition, the head protection chamber 34 and the side protection chamber 50 are filled. The base airbag 24 moves the head protection chamber 34 to its intended position in the seat longitudinal direction L in front of the vehicle occupant 32 and, due to the inherent stability of the base airbag 24 and, possibly, the bearing surface 40 on the thighs of the vehicle occupant 32, forms a dimensionally stable basis for the head protection chamber 34. The latter extends in front of the torso and the head 38 of the vehicle occupant 32 and cushions the latter if he/she is displaced forward along the seat longitudinal direction L.

The optionally provided side protection chamber 50 is brought into its intended position by the connecting portion 26 and is stabilized by the latter in said position so that the head 38 of the vehicle occupant 32 is cushioned by the side protection chamber 50, if it is displaced along the seat transverse direction Q.

The base airbag 24 can be stabilized by appropriate stabilizing elements 58 and/or support elements 62 in its L-shape so that the connecting portion 26 and the cushioning portion 28 substantially maintain their unloaded position while the vehicle occupant 32 is cushioned by the head protection chamber 34 and/or the side protection chamber 50.

The invention claimed is:

1. A vehicle occupant restraint system comprising a vehicle seat including a backrest with a seat back surface, wherein the seat back surface is provided for a vehicle occupant seated in the vehicle seat to lean against the same, and comprising an airbag module integrated in the backrest which comprises an airbag that is L-shaped in a horizontal section plane and includes a cushioning portion forming a first leg of the L and being positioned along a seat longitudinal direction spaced apart from the seat back surface, as well as a connecting portion forming a second leg of the L and connecting the cushioning portion to the backrest, wherein a fillable head protection chamber projecting from the cushioning portion along a seat vertical direction which includes a head cushioning surface facing the seat back surface is arranged on the cushioning portion, wherein the cushioning portion extends vertically upward from the connecting portion and has a lower side comprising a bearing surface, wherein the connecting portion is configured to extend along and above thighs of the vehicle occupant, and the cushioning portion is configured to extend laterally across the thighs of the vehicle occupant so that the bearing surface is positioned against the thighs of the vehicle occupant seated in the vehicle seat so that the thighs in combination with the backrest act as a reaction surface that supports the cushioning portion against the vehicle occupant moving forward into engagement with the cushioning portion.

2. The vehicle occupant restraint system according to claim 1, wherein the cushioning portion and/or the connecting portion include at least one stabilizing element which stabilizes the position of the cushioning portion during a situation of restraint.

3. The vehicle occupant restraint system according to claim 1, wherein, in a completely filled state of the airbag, the head protection chamber has an internal pressure different from that of a base airbag formed of the connecting portion and the cushioning portion.

4. The vehicle occupant restraint system according to claim 3, wherein overflow openings or overflow valves through which filling gas flows from the cushioning portion into the head protection chamber are provided between the cushioning portion and the head protection chamber.

5. The vehicle occupant restraint system according to claim 3, wherein the head protection chamber is connected to an inflator via a separate filling gas supply line which is separated from a filling gas supply line to the remaining airbag.

6. The vehicle occupant restraint system according to claim 1, wherein the airbag module additionally comprises a fillable side protection chamber which, in the filled state, extends on the side of the backrest next to a head of the vehicle occupant.

7. The vehicle occupant restraint system according to claim 6, wherein the side protection chamber is attached to an upper end of the connecting portion of the airbag in the seat vertical direction.

8. The vehicle occupant restraint system according to claim 6, wherein at least one support element associated with the airbag which constitutes an additional reaction surface against which the connecting portion, the cushioning portion, the head protection chamber and/or the side protection chamber rest, when the vehicle occupant is cushioned by the airbag, is provided on the vehicle seat.

9. The vehicle occupant restraint system according to claim 1, wherein the connecting portion is configured as a chamber configured to deliver inflation fluid from the backrest mounted inflator to the cushioning portion and to support the cushioning portion against movement away from the seat back in response to vehicle occupant moving forward into engagement with the cushioning portion, wherein the cushioning portion has a vertical height that is at least twice a vertical height of the connecting portion.

10. The vehicle occupant restraint system according to claim 1, wherein the connecting portion is configured as a chamber that is separate from the cushioning portion and configured to deliver inflation fluid from to the cushioning portion so that the connecting portion has a pressure that is greater than a pressure of the cushioning portion when the airbag is inflated and deployed.

11. The vehicle occupant restraint system according to claim 1, wherein the connecting portion is configured to space the cushioning chamber from the occupant so that the cushioning portion is positioned above knees of the occupant.

* * * * *